Patented Jan. 26, 1954

2,667,488

UNITED STATES PATENT OFFICE 2,667,488

TRIS QUINOLINIUM COMPOUNDS

Hans Andersag, Wuppertal-Elberfeld, Hellmut Weese, Wuppertal-Vohwinkel, and Friedrich Bossert, Wuppertal-Elberfeld, Germany, assignors to Schenley Industries, Inc., New York, N. Y.

No Drawing. Application June 23, 1951, Serial No. 233,236

Claims priority, application Germany June 23, 1950

6 Claims. (Cl. 260—286)

The present invention relates to quaternary ammonium compounds and more particularly to products having a curare-like activity.

Such products are obtained according to this invention by producing quaternary ammonium compounds with at least three quaternary nitrogen atoms wherein the nitrogen atoms are connected to each other by merely aliphatic hydrocarbon bridges. The compounds of the present invention have the following general formula:

$$X_3YZ$$

wherein X is a quaternary nitrogen atom of a tertiary amine bearing an anion linked thereto by a coordinate valence bond, Y is a branched-chain aliphatic group having at most six carbon atoms, and Z is hydrogen, alkyl or the same as X.

In contradistinction to other synthetic quaternary bases the N-atoms of which are not linked by merely aliphatic hydrocarbon bridges, and to quaternary ammonium compounds carrying only one or two quaternary N-atoms in merely aliphatic linkage, the products of the present invention are distinguished by an increased curare-like activity. The compounds wherein N is the heteroatom of an isoquinoline nucleus have proved to be especially suitable according to the invention.

The production of the compounds of the above defined type is accomplished according to conventional methods by reacting reactive esters of aliphatic tri- or polyhydroxy-compounds with tertiary amines or cyclic bases or by treating primary, secondary or tertiary aliphatic tri- or polyamines with reactive esters of aliphatic alcohols. The term "reactive esters" shall comprise esters with inorganic or organic acids, such as halogen hydracids, methyl-sulfuric acid, benzene-sulfonic acid, toluene-sulfonic acid. The reaction is accomplished either by direct union of the components or in the presence of diluents or solvents, such as alcohols, hydrocarbons, ethers.

The products obtained according to the process of the present invention are colorless or slightly yellow crystalline compounds. They are easily soluble in water and lower alcohols, difficultly soluble or insoluble in ether, acetone, ethyl acetate, benzene and similar solvents.

The compounds of the present invention find application as spasmolytics. Furthermore, they are to be employed in surgery for relaxation of the muscular apparatus during narcosis.

Example 1

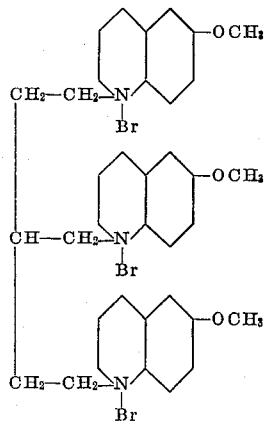

1.6 grams of 1:5 - dibromo - 3 - bromomethylpentane are boiled with 3 grams of 6-methoxyquinoline on the water-bath for 20 hours. The reaction product is pulverized, washed with ether, dissolved in methanol, the solution is concentrated and gradually mixed with acetone. The compound of the above formula precipitates in crystals melting at 204° C.

By replacing in the above reaction the 6-methoxy-quinoline compound by 3 grams of 5-methoxyquinoline an analogous product having the methoxyl group in the 5-position of the quinoline nucleus is obtained. The compound melts on heating above 150° C. with decomposition.

Example 2

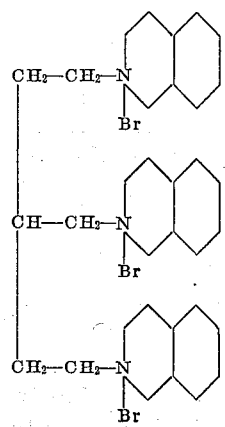

2 grams of 1:5-dibromo-3-bromomethyl-pentane are heated with 4 grams of isoquinoline on the water-bath for 10 minutes. Thereupon the reaction tube is sealed by melting and the temperature is kept at 100° C. for a further 15 hours. The viscous mass is worked up with ether, the ether is decanted and the residue is dissolved in some absolute alcohol while warm. After standing for a prolonged period the reaction product having the above formula crystallizes. It forms a ompound and melts after drying at about 180° C. with decomposition. The difficultly soluble picrate that melts at 205–206° C.

Example 3

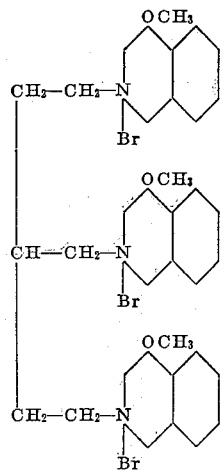

3 grams of 1:5-dibromo-3-bromomethyl-pentane are heated with 4.5 grams of 4-methoxy-isoquinoline in a mixture of 25 milliliters of toluene and 5 milliliters of n-butanol to 100–105° C. for five hours. After heating for a short period crystallization begins and is completed by subsequent cooling. After crystallization from alcohol the reaction product melts at about 225° C. with decomposition. It has the above formula.

Example 4

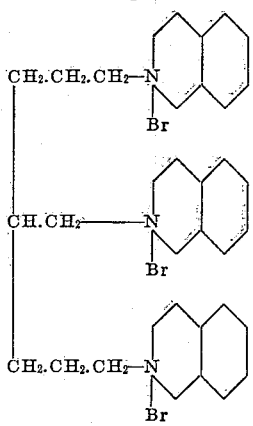

11.4 grams of 1:7-dibromo-4-bromomethyl-heptane and 13.8 grams of isoquinoline are refluxed for 45 hours in 60 milliliters of absolute alcohol. After cooling the alcoholic solution is poured into an excess of ether, whereupon the reaction product precipitates. The crude product is purified by repeated washing with ether. It is then dissolved in 200 milliliters of alcohol and a solution of 27 grams of picric acid is added. The picrate precipitates and is recrystallized from acetic acid of 70% strength. It melts at 224–225° C. by means of dilute hydrobromic acid the bromide is regenerated from the above picrate.

After recrystallization from alcohol it melts at about 133° C.

In the same manner the corresponding quaternary products are obtained from isoquinoline and the following tribromides: From 1:6-dibromo-3-β-bromoethyl-hexane, a quaternary bromide of the melting point of 235° C., which forms a picrate of the melting point 201° C.; from 1:5-dibromo-3-β-bromo-ethyl-pentane, a quarternary bromide of the melting point 270–272° C., which forms a picrate of the melting point 219–220° C.; from 1:7-dibromo-3-β-bromoethyl-heptane, a quaternary bromide, which forms a picrate of the melting point 178° C.; from 1:6-dibromo-3-β-bromomethyl-hexane, a quaternary bromide of the melting point 219° C., which forms a picrate of the melting point 215° C.; from 1:8-dibromo-3-bromomethyl-octane, a quaternary compound which forms a picrate of the melting point 197° C.; from 1:8-dibromo-4-bromomethyl-octane, a quaternary bromide, which forms a salt with Reinecke's acid having a melting point of 180° C.; from 1:7-dibromo-3-β-bromoethyl-heptane, a quaternary bromide which forms a picrate of the melting point 153° C.; from 1:7-dibromo-4-β-bromoethyl-heptane, a quaternary bromide which forms a picrate of the melting point 153° C.; from 1:9-dibromo-3-bromomethyl-nonane, a quaternary bromide which forms a picrate of the melting point 213° C.; from 1:9-dibromo-4-bromomethyl-nonane, a quaternary bromide which forms a picrate of the melting point 146° C.; from 1:9-dibromo-5-β-bromomethyl-nonane, a quaternary bromide which forms an iodide of the melting point 180° C.; from 1:8-dibromo-4-β-bromoethyl-octane, a quaternary bromide which forms a salt of Reinecke's acid of the melting point 201° C.; and from 1:7-dibromo-4-α-bromopropyl-heptane, a quaternary bromide of the melting point 153° C.

We claim:

1. A compound represented by the formula:

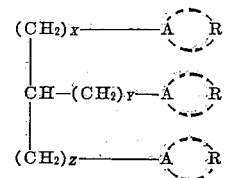

wherein X, Y and Z are integers, individually less than 7, and A is the quaternary nitrogen atom of a radical chosen from the group consisting of quinolinium halides, methoxy quinolinium halides, isoquinolinium halides and methoxy isoquinolinium halides wherein the halide anion is linked to the quaternary nitrogen atom by a coordinate valence bond and R represents the remaining elements of the named quinolinium radicals.

2. A compound represented by the formula:

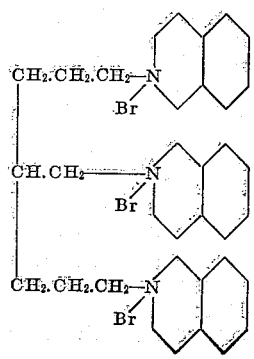

3. A compound represented by the formula:
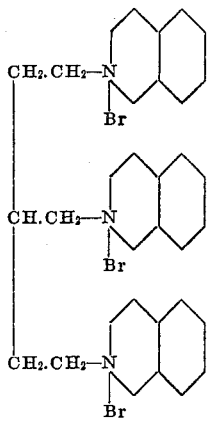
4. A compound represented by the formula:
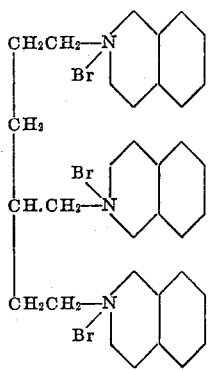
5. A compound represented by the formula:
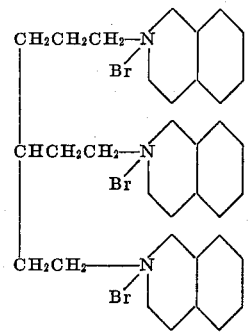
6. A compound represented by the formula:
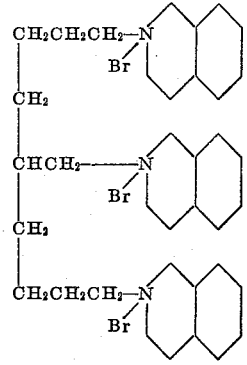
HANS ANDERSAG.
HELLMUT WEESE.
FRIEDRICH BOSSERT.
References Cited in the file of this patent
UNITED STATES PATENTS
| Number | Name | Date |
|---|---|---|
| 2,393,351 | Wilson | Jan. 22, 1946 |
| 2,425,772 | Wilson | Aug. 19, 1947 |
| 2,425,773 | Wilson | Aug. 19, 1947 |
| 2,465,774 | Wilson | Mar. 29, 1949 |